United States Patent Office 2,943,844
Patented July 5, 1960

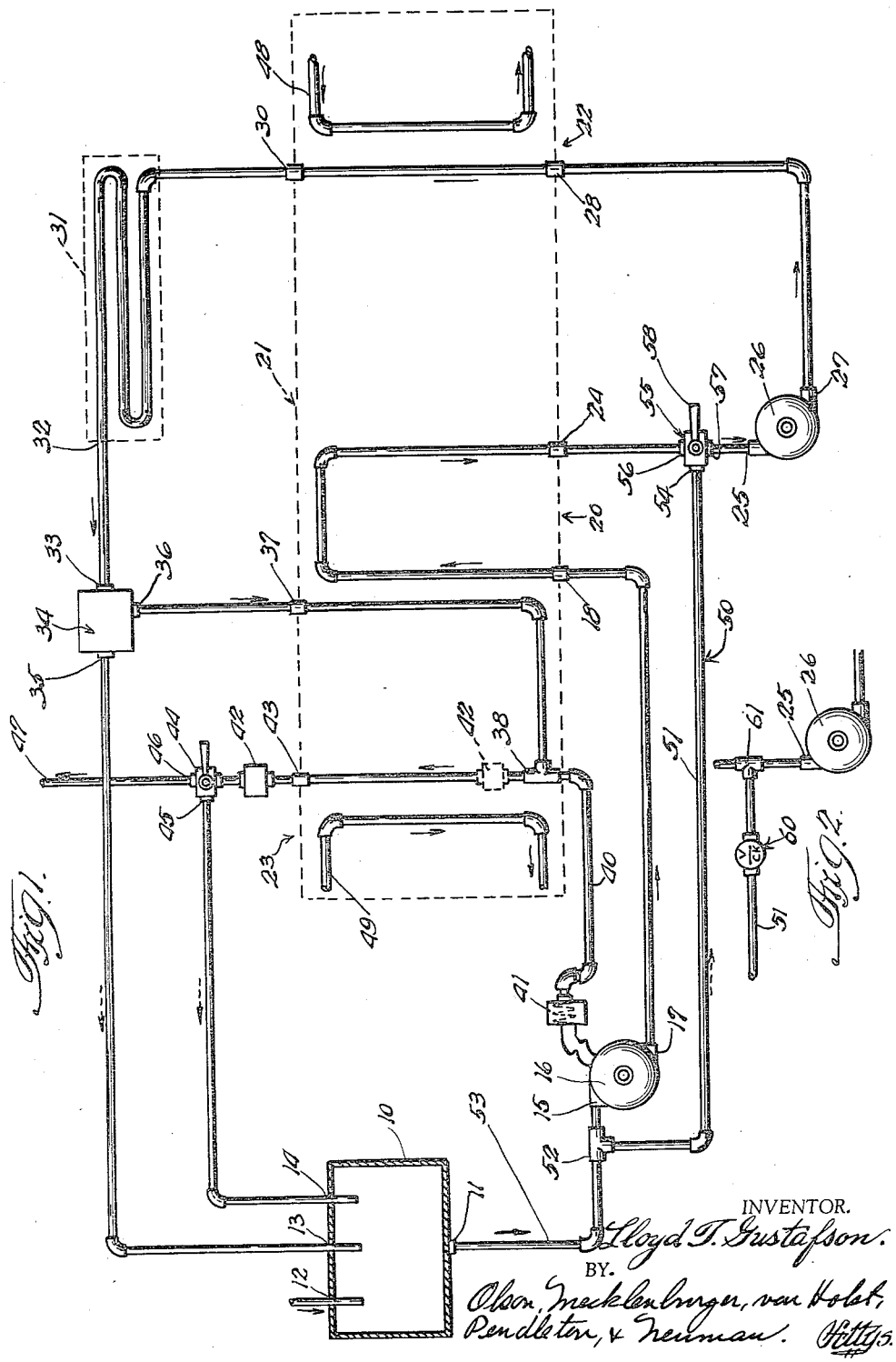

2,943,844
HEAT-TREATING APPARATUS

Lloyd T. Gustafson, Park Ridge, Ill., assignor to The Creamery Package Mfg. Company, Chicago, Ill., a corporation of Illinois Filed Jan. 31, 1957, Ser. No. 637,568

3 Claims. (Cl. 257—312)

This invention relates to a heat-treating apparatus, and more particularly to apparatus used in the processing of food products, beverages, and the like.

In the processing of dairy products, for example, extreme care must be exercised in preventing contamination of such products during such processing period. This care stems from the rigid enforcement by public and quasi-public authorities of numerous public health laws, regulations, and/or codes. In order to comply with the provisions of these laws, regulations, and/or codes, certain problems have confronted the industry in the operation of high-temperature, short-time pasteurizing equipment. One such problem occurs in the regenerative heater section during initial starting of the equipment and until the product, which is to flow through the high-temperature side of the regenerator, has attained a pasteurized state, or when the treated product is in diverted flow at the entrance of the down side of the regenerative section of the heat exchanger. This latter condition infrequently occurs. It is compulsory in regenerative heater sections of this type, where the hot pasteurized product flow in the down side of such section is in heat exchange relation with respect to the untreated raw product flow in the up side of such section, and such sides are isolated by a thermal conductive wall, that the pasteurized product flow be at a higher pressure than the raw product flow. This pressure differential on opposite sides of the wall must be maintained at all times in order that contamination of the pasteurized product by the raw product will not occur in case a leak or rupture results in the separating wall. During start-up of the equipment, for example, no flow of the product through the high temperature or down side of the regenerator is permitted because of a control, such as a suitable thermal responsive diversion valve, or the like, which is disposed ahead of the inlet of such high temperature side. The function of such a valve is to automatically divert the product directly to the float tank or reservoir for the raw product so long as the temperature of the latter is below a given intensity when it reaches such valve. Thus, by reason of the absence of product flow in the high temperature side of the regenerator, no product pressure is created. Under this condition, therefore, and in order to maintain the aforementioned required pressure differential between the two sides of the regenerator, it is imperative, if product flow continues on the raw product side of the regenerator, that such side of the regenerator be maintained at a relatively lower pressure with respect to the high temperature side of the regenerator. It is the establishment of this relatively lower pressure in the raw product side of the regenerator which has heretofore required the utilization of either costly and complex controls and the like, or the utilization of oversized equipment which, in addition to increased cost and other difficulties, materially reduces the operating efficiency of the apparatus.

Thus, it is one of the objects of this invention to provide heat-treating apparatus which overcomes the problems previously encountered during the aforementioned start-up or diverted flow periods, without the utilization of costly and complex controls or without the requirement of oversizing certain component parts of the apparatus.

It is a still further object of this invention to provide a means which is compact and simple in construction and may be readily incorporated in existing apparatus, without requiring extensive modification or redesigning of the existing apparatus.

It is a still further object of this invention to provide heat-treating apparatus which complies with existing public health laws, regulations, and/or codes, and improves materially the operating efficiency of the apparatus.

Further and additional objects will appear from the description, accompanying drawings, and appended claims.

In accordance with one embodiment of this invention, an apparatus of the type described is provided which utilizes a fluid or product reservoir, a first pump, a heat exchange unit provided with a regenerative section, a second pump, and bypass means. The first pump has the intake side thereof communicating with the reservoir and the discharge side thereof connected to a low fluid temperature inlet of the regenerative section. The second pump, in turn, has the intake side thereof communicating with a medium fluid temperature outlet. The bypass means has one portion thereof in communication with the intake side of the first pump, and a second portion thereof in communication with the medium fluid temperature outlet of the regenerative section and the intake side of the second pump. The bypass means is operable, during only predetermined periods of operation of the apparatus, to effect fluid flow through such bypass means in circumvention of the first pump and the portion of the regenerative section connected thereto.

For a more complete understanding of this invention, reference should be made to the drawing, wherein:

Figure 1 is a diagrammatic view of improved heat-treating apparatus, embodying one form of the invention.

Fig. 2 is a fragmentary view of a modified form of the invention adapted for use in conjunction with apparatus of the type shown in Fig. 1.

Referring now to the drawing and, more particularly, to Fig. 1, a heat-treating apparatus is shown which comprises a reservoir 10, often referred to as a "float tank," having a discharge outlet 11 formed in the underside thereof and three relatively spaced inlets 12, 13 and 14, formed adjacent the upper side of said reservoir. Inlet 12 is connected by suitable piping to a source of supply of the product to be treated. The product in question must be in a fluid state when undergoing treatment in the apparatus. The outlet 11 of the reservoir is connected by suitable piping to the intake side 15 of a booster pump 16. The function of the remaining inlets 13 and 14 of the reservoir is for diverted product flow, the occurrence of which will be described more fully in the description to follow.

The discharge side 17 of pump 16, which is normally a centrifugal type but may, if desired, be a positive type under certain conditions, is connected to a low temperature inlet 18 of a regenerative section 20, the latter in this instance forming a part of a heat exchange unit 21. Unit 21, as indicated by a dotted line, may include a heater section 22 and a cooling section 23, in addition to the regenerative section 20. It is to be understood, of course, that the heat exchange unit may have more or less sections than that indicated; however, at least one regenerative section is necessary. Section 20, in addition to inlet 18, is provided with a medium temperature outlet 24 which, in turn, communicates with the intake side 25 of a timing pump 26. The portion of the regenerator disposed intermediate inlet 18 and outlet 24 is referred to as the "up" side or raw product side. The timing pump 26, often referred to as the "metering" pump, is the prime mover for circulating the product through the remainder of the apparatus. The pump 26 is customarily a positive pump variety. The discharge side 27 of pump 26 is connected to a medium temperature inlet 28 forming a part of heater section 22. The product, upon flowing through the heater section 22, is discharged therefrom through a high temperature outlet 30. From outlet 30 the product, at an elevated temperature, flows to a holder tube 31. Where milk is the product being treated in the apparatus, the temperature thereof, upon leaving outlet 30 and entering tube 31 may be, by way of example, 170° F. The configuration and size of holder tube 31 is designed so as to insure that the flowing product will remain at its elevated temperature for a predetermined length of time within the holder tube and thus effect either pasteurization or sterilization of the product. The dimensions of the holder tube will depend upon the nature of the product being treated, the temperature and rate of flow of the product, and the type of treatment of the product desired (i.e., pasteurization, sterilization, etc.).

The outlet 32 of holder tube 31 is connected to an inlet 33 for a thermal responsive diversion type valve 34. Valve 34, in this instance, includes a first outlet 35 which is connected directly to the inlet 13 of reservoir 10, and a second outlet 36 which is connected to a high temperature inlet or entrance 37 for the down side or treated product side of regenerative section 20. Valve 34, when in its diverted flow position, which is automatically effected by the product being below a given temperature, causes inlet 33 and outlet 35 to be interconnected, and prevents continued flow of the product through the down side of the regenerator and the remainder of the heat exchange unit 21, as well. The raw product and the treated product are normally in counterflow relation within the regenerative section and separated from one another by a thermal conductive wall, normally formed by a relatively thin metallic plate.

From the regenerative section 20 of unit 21 the treated product in forward flow passes through a T connection 38 which has one side thereof connected by suitable piping 40 to a pressure-responsive control 41, which is operative to start and stop booster pump 16.

Control 41 is adjusted so as to permit operation of pump 16 only when there is flow of the product through the down side of the regenerator. Upon pump 16 being actuated, flow of the product occurs through the raw product side of the regenerative section 20, as well. Thus, product flow through the up side of the regenerative section is dependent first upon product flow through the down side. The aforementioned pressure differential within the regenerative section, in a manner to be described hereinafter, is automatically maintained by reason of this sequence of operation of pumps 16 and 26. Under normal operating conditions, the product flows from the down side of the regenerator, past T connection 38, through cooling section 23 and out through an outlet 43. Where a sufficient drop in product flow pressure occurs in the cooling section 23, a back pressure of desired magnitude is created, which produces the required pressure differential between the up and down sides of the regenerator, so as to comply with the aforementioned public health restrictions. However, to insure the creation of the necessary pressure differential, a restrictor 42, or the like, may be inserted in the flow path either ahead of, or directly after, the cooling section 23, the former being shown in dotted lines in Fig. 1.

Connected to outlet 43 of section 23 is a valve 44 having one outlet 45 thereof communicating directly with inlet 14 of reservoir 10, and a second outlet 46 connected by suitable piping 47 to a bottle-filling machine, or the like, not shown. In Fig. 1, valve 44 is shown as being manually adjusted; however, if desired, the valve may be of an automatic type, the adjustment of which is controlled by the bottle-filling machine, or the like, connected to piping 47, or by a pressure sensitive control, not shown, disposed in the connection between the regenerative section 20 and the cooling section 23.

The heat for the heater section 22 may be obtained from steam or some other medium supplied from some suitable outside source through passageway 48, which is in heat exchange relation with the product flowing from inlet 28 to outlet 30 in the section 22. The cooling medium, on the other hand, for cooling section 23 may be supplied from an outside source through a suitable passageway 49, which is in heat exchange relation with the product flowing from the T connection 38 to outlet 43. In instances where the flowing product is milk, the temperature thereof, upon passing through outlet 43 of the cooling section, may be approximately 35° F.

Incorporated in the aforedescribed apparatus is the bypass means 50 which constitutes the crux of the present invention. The function of the bypass means is to cause raw product to flow from the reservoir 10 to timing pump 26 by way of circumventing booster pump 16 and the associated up side of the regenerator during start-up of the aforedescribed apparatus or when valve 34 is in diverted flow position.

Bypass means 50, in one form shown in Fig. 1, constitutes pipe section 51 and a T connection 52, connected to one end of section 51 and interposed reservoir 10 and the intake side 15 of booster pump 16. The other end of pipe section 51 is connected to an inlet 54 forming a part of a control valve 55; the latter, in this instance, being interposed between the medium temperature outlet 24 of regenerator 20 and the intake 25 of pump 26. Valve 55 also includes a second inlet 56 connected to the outlet 24 of regenerative section 20. The outlet port 57 of valve 55 is connected to the intake side 25 of timing pump 26. Valve 55 is shown in this instance to be manually adjusted and, when in one position of adjustment, causes flow of the product only through piping 51 and thereby circumvents booster pump 16 and the up side of regenerative section 20 connected thereto. When, on the other hand, the valve 55 is in a second position of adjustment, the product flow is through booster pump 16 and the regenerator up side and not through bypass pipe section 51. Where the adjustment of valve 55 is manual, the operator will make such adjustment from the first to the second positions after the timing pump 26 only has been running a predetermined time interval following its initial start-up.

In Fig. 2 a second form of bypass means is shown, wherein a check valve 60 is incorporated in pipe section 51 and a T connection 61 is substituted for the valve 55 disposed between outlet 24 of regenerative section 20 and intake side 25 of the timing pump 26. The adjustment of the check valve 60 is automatic and dependent upon the pressure of the product flowing through the apparatus. Once booster pump 16 is in operation, the pressure of the product flowing from outlet 24 to the intake side 25 of timing pump 26 is greater than the pressure of the product on the reservoir side of the check valve and, thus, the check valve automatically closes and prevents further flow of the product through pipe section 51.

The primary function of booster pump 16 is to produce sufficient flow velocity to overcome the flow resistance encountered in the up side of the regenerative section 20 of the heat exchange unit 21. Thus, the product flowing through the improved apparatus during initial start-up thereof is not required to pass through a portion of the regenerative section under a relatively low pressure.

A third modified form of the bypass means is not shown, but is similar to the form shown in Fig. 2, except that check valve 60 is omitted. In place of the check valve 60, the capacities of the booster and timing pumps 16 and 26 respectively are sized relative to one another. Where forward flow of the product through pipe section 51 is to be stopped completely once pump 16 commences operation, the capacity of pump 16 is made slightly greater than that of pump 26, so that the pressure of the product at T connection 61 is greater than the product pressure at T connection 52. Under such conditions there will be a slight recirculation of the product back through line 51, in which case the efficiency of the apparatus will not be as great as that which occurs with the bypass means shown in Figs. 1 and 2.

Where, however, complete stoppage of forward flow of the product through pipe section 51 is not essential, once pump 16 is in operation, the capacity of pump 16 may be slightly less than the capacity of pump 26, in which case there will be only a slight forward flow of the product through such pipe section, once pump 16 is in operation, and a large forward flow when pump 16 is not in operation. In this form of the bypass means the efficiency of the apparatus is likewise not as great as that of the forms shown in Figs. 1 and 2.

In the third form of the bypass means it is preferred that both pumps 16 and 26 be of the positive type, in which case variations in capacities are relatively small as compared to a centrifugal type pump.

Thus, a heat-treating apparatus has been provided which is simple and inexpensive in construction and yet satisfactorily meets the requirements of the public health laws, regulations, and/or codes. In addition, the operating efficiency of the apparatus is materially improved.

While several embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

I claim:

1. An apparatus for heat-treating a flowing fluid, comprising a fluid source; a heat exchange unit provided with a regenerative section, the latter having an upside through which such fluid is caused to flow and a downside through which such fluid is caused to flow subsequent to being heated, said upside and downside being separated from one another by a heat-conductive wall, said upside and downside each being provided with a fluid inlet and a fluid outlet, the fluid pressure in said downside always being greater than the pressure in said upside, during operation of the apparatus; a booster pump having the intake side thereof connected to said source and the discharge side thereof connected to said upside fluid inlet; a timing pump having the intake side thereof connected to said upside fluid outlet and the discharge side thereof communicating with said downside fluid inlet; and bypass conduit means for such fluid whereby circumvention of said upside by such fluid may be effected, said bypass conduit means having one end thereof communicating with said upside fluid inlet and the other end thereof communicating with the intake side of said timing pump; all of such fluid flowing through said bypass conduit means only when said timing pump is operating and said booster pump is at rest.

2. An apparatus for heat-treating a flowing fluid comprising a fluid source; a heat-exchange unit provided with a regenerative section, the latter having an upside through which such fluid is caused to flow and a downside through which such fluid is caused to flow subsequent to being heated, said upside and downside being separated from one another by a heat-conductive wall, said upside and downside each being provided with a fluid inlet and a fluid outlet, the fluid pressure in said downside always being greater than the pressure in said upside, during operation of the apparatus; a booster pump having the intake side thereof connected to said source and the discharge side thereof connected to said upside fluid inlet; a timing pump having the intake side thereof connected to said upside outlet and the discharge side thereof communicating with said downside inlet; bypass conduit means for such fluid whereby circumvention of said upside by such fluid may be effected, said bypass conduit means having one end thereof communicating with said upside inlet and the other end thereof communicating with the intake side of said timing pump; all of such fluid flowing through said bypass conduit means only when said timing pump is operating and said booster pump is at rest; and fluid pressure-responsive control means communicating with said downside outlet, said control means being operatively connected to said booster pump to effect actuation thereof only upon a predetermined fluid pressure being attained in said downside; the fluid pressure developed by said booster pump being such as to overcome the resistance to fluid flow encountered in said upside, but not greater than the fluid pressure maintained in said downside.

3. An apparatus for heat-treating a flowing fluid, comprising a fluid source; a heat-exchange unit provided with a regenerative section, the latter having an upside through which such fluid is caused to flow and a downside through which such fluid is caused to flow subsequent to being heated, said upside and downside being separated from one another by a heat-conductive wall, said upside and downside each being provided with a fluid inlet and a fluid outlet, the fluid pressure in said downside always being greater than the pressure in said upside, during operation of the apparatus; a booster pump having the intake side thereof connected to said source and the discharge side thereof connected to said upside fluid inlet; a timing pump having the intake side thereof connected to said upside outlet and the discharge side thereof communicating with said downside inlet, the magnitude of the resistance to fluid flow in said upside being greater than the suction force developed by said timing pump; bypass conduit means for such fluid whereby circumvention of said upside by such fluid may be effected, said bypass conduit means having one end thereof communicating with said upside inlet and the other end thereof communicating with the intake side of said timing pump; all of such fluid flowing through said bypass conduit means only when said timing pump is operating and said booster pump is at rest; and fluid pressure-responsive control means communicating with said downside outlet, said control means being operatively connected to said booster pump to effect actuation thereof only upon a predetermined fluid pressure being attained in said downside; the fluid pressure developed by said booster pump being such as to overcome the resistance to fluid flow encountered in said upside, but not greater than the fluid pressure maintained in said downside.

References Cited in the file of this patent

UNITED STATES PATENTS

| | | |
|---|---|---|
| 2,027,929 | Olson | Jan. 14, 1936 |
| 2,414,623 | Wildermuth | Jan. 21, 1947 |
| 2,512,045 | Steinberg et al. | June 20, 1950 |
| 2,532,856 | Ray | Dec. 5, 1950 |